Oct. 10, 1961  BACKMAN WONG  3,003,338

LUBRICATION MEANS FOR SEALED COUPLINGS

Filed Aug. 25, 1960

INVENTOR.
BACKMAN WONG.

BY Leo J. MaLaiii.
his ATTORNEY

United States Patent Office 3,003,338
Patented Oct. 10, 1961

3,003,338
LUBRICATION MEANS FOR SEALED COUPLINGS
Backman Wong, Baltimore, Md., assignor to Koppers Company, Inc., a corporation of Delaware
Filed Aug. 25, 1960, Ser. No. 51,969
7 Claims. (Cl. 64—9)

This invention relates to apparatus for the lubrication of sealed couplings and, more particularly, to the provision of means for adding lubricant to a sealed coupling while the coupling is in continuous running operation.

Although there are numerous prior art methods of lubrication, there are special applications in which the conventional methods of lubrication are either undesirable or infeasible. For example, continuous lubrication has the drawbacks of being elaborate, expensive, and, because of the elaborate system involved, the disadvantage of requiring maintenance shut-down for cleaning. Another application known as oil collector intermittent lubrication is exposed to the atmosphere and is, therefore, of little advantage. In sealed-in applications, either oil or grease may be employed, however, in the event of the use of oil, there is frequent need for the addition of oil to compensate for evaporation loss. Although grease has the advantage of offering longer operating periods, it also offers a disadvantage in that the grease separates under centrifugal action. Therefore, whenever possible it is preferable to use oil to obtain its resistance to separation under centrifugal action and to retain its high load capacity.

It is, therefore, an object of this invention to provide a lubrication device for a sealed coupling wherein oil may be supplied to the device by a simple expedient without the necessity of shutting down the machine for the lubrication process.

Other aims, objects, and advantages will be in part pointed out and in part apparent in the following detailed description, wherein.

Figure 1:
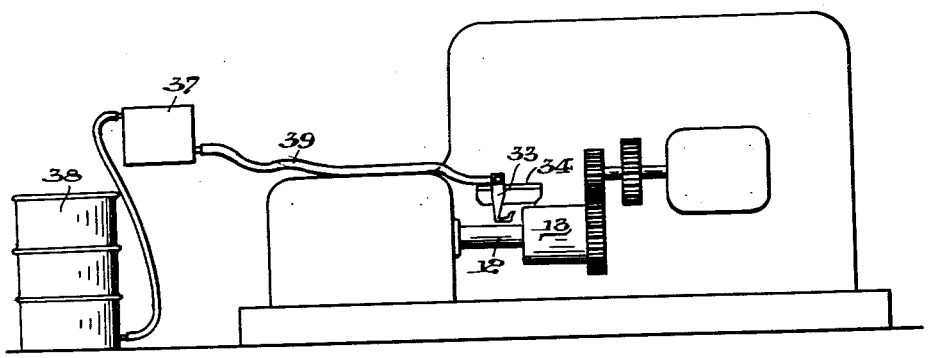
FIGURE 1 shows a machine embodying the invention.
Figure 2:
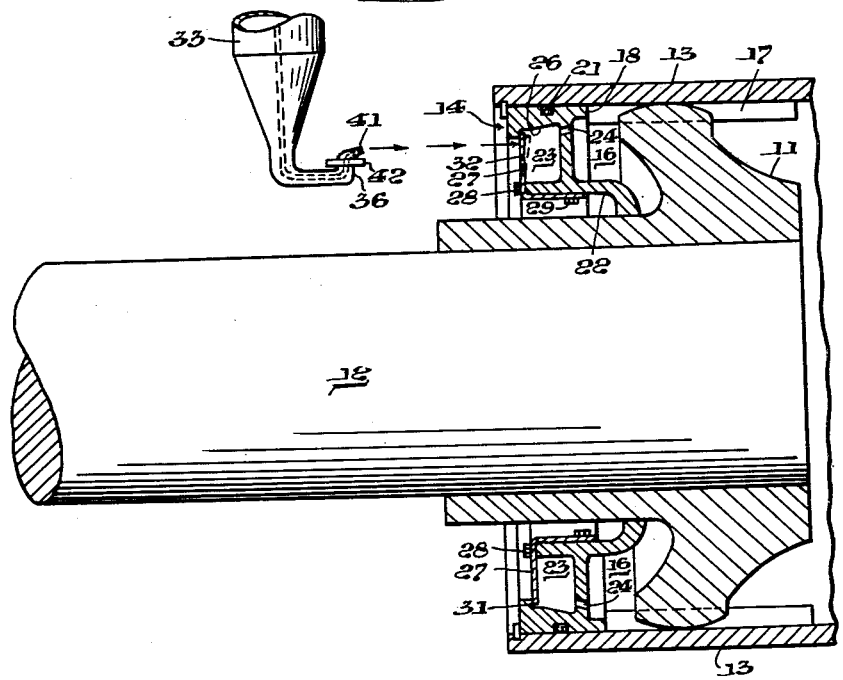
FIGURE 2 is a view of portions of the lubrication system with the details of the sealed coupling being shown in section.

Referring to the drawings, sealed coupling 11 is shown disposed between drive shaft 12 and driven shaft 13. Removeable end ring 14 is employed to provide a lubrication well or zone 16 to supply the necessary lubricant for the coupling. In this application, coupling 11 is shown fixed to drive shaft 12 and slideably engaged with driven shaft 13 by means of splines 17 formed integral with driven shaft 13. End ring 14 is retained in position with the shoulder 18. Lubricant is prevented from oozing outwardly of lubrication well 16 by the use of seal 21 and by the close fit of flexible portion 22 of end ring 14. Formed integral with end ring 14 is chamber 23, an annular cavity communicating with lubrication well 16 through a series of inlet holes 24.

These inlet holes 24 are dispersed radially and are drilled at an angle to facilitate the feeding of lubricant from chamber 23 to lubrication well 16 under the action of centrifugal force. Sloping surface 26 is provided to encourage the feeding of lubricant to inlet holes 24. Thus, chamber 23 functions as a storage chamber for the lubrication well 16 and must, therefore, be provided with means for inserting lubricant therein.

To enable this injection of lubricant into chamber 23, end ring 14 is provided with a metal spring disc 27 attached to end ring 14 by means of fasteners 28 and 29. Being biased outwardly, metal spring disc 27 is continuously held against shoulder 31, thereby providing the outer wall for chamber 23. Since metal spring disc 27 is flexible and annular in shape it may be pressed inwardly at some point such as point 32 forcing the metal spring disc 27 to bend inwardly as it rotates past the point of contact.

Lubricant injector 33 is slideably mounted on fixture 34 and may be moved laterally so that tip 36 thereof can be so disposed that the end portion thereof will enter chamber 23 once contact has been made to move the metal spring disc inwardly from shoulder 31. Lubricant can then be forced by pump 37 from source 38 through tube 39 into lubricant injector 33 and thence from nozzle 41 into chamber 23 even while metal spring disc 27 is continuously rotating thereby. To facilitate lubrication while the coupling 11 continues its rotation an over-running bearing 42 is mounted on the barrel of lubricant injector 33 at tip 36. In this way a rolling contact is maintained between the lubricant injector 33 and the deflected metal spring disc 27 during the lubricant injection operation. When sufficient lubricant has been inserted into chamber 23, lubricant injector 33 is simply retracted and metal spring disc 27 returns to its position abutting shoulder 31. This entire operation may be executed without the necessity of shutting down the machinery.

It is further contemplated that lubricant injector 33 be a portable unit to be attached to fixture 34 when lubrication is contemplated. Further, fixture 34 may be made to enable adjustment of lubricant injector 33 to govern the height of over-running bearing 42 relative to metal spring disc 27.

Depending upon the thickness of metal spring disc 27, the opening formed between shoulder 31 and metal spring disc 27 upon the deflection thereof by contact from over-running bearing 42 may be an annular one or simply a depression of metal spring disc 27 at the point of contact.

As will be apparent to those skilled in the art, various changes and modifications may be made in the details of the device embodied in the present invention without departing from the scope of the appended claims.

What is claimed:

1. A sealed coupling comprising in combination coupling means interposed between a first member and a second member, annular sealing means interposed between one of said members and said coupling means, said sealing means and said coupling means defining a lubrication well, said sealing means having a cavity formed therein, said cavity communicating with said lubrication well and annular closure means forming part of the outer wall of said cavity, said closure means biased outwardly into closed position and movable inwardly under superior force acting thereon from without said cavity whereby a lubricant injector may move said closure means inwardly to insert lubricant into said cavity during rotation of said sealing means.

2. A sealed coupling as described in claim 1 wherein the annular means is a metal spring disc forming the outer wall of the cavity, said metal spring disc being fastened to the body of the sealing means along the inner circumference of said disc and being biased into seating engagement against a portion of the outer wall of said sealing means along the outer circumference of said disc.

3. A sealed coupling comprising in combination coupling means interposed between a driving member and a driven member, annular removeable sealing means interposed between said driven member and said coupling means, said sealing means, said coupling means and said driven member defining a lubrication well, said sealing means having an annular cavity formed therein, said cavity communicating with said lubrication well and deflectable annular closure means forming part of the outer wall of said cavity, said closure means biased outwardly into closed position and movable inwardly under the action thereon of superior force from outside said cavity whereby a lubricant injector may deflect said closure means inwardly and insert lubricant under pressure into said cavity during rotation of said sealing means.

4. A sealed coupling comprising in combination coupling means interposed between a driving member and a driven member, annular sealing means interposed between said driven member and said coupling means, said sealing means and said coupling means defining a lubrication well, said sealing means having an annular cavity formed therein, said cavity communicating with said lubrication well though inlet holes in a wall of said sealing means and deflectable annular closure means forming part of the outer wall of said cavity, said closure means being biased outwardly into closed position and being movable inwardly under superior force acting thereon from without said cavity to permit deflection thereof by a lubricant injector for the insertion of a lubricant into said cavity during the rotation of said sealing means with the lubricant being retained temporarily within said cavity for dissemination therefrom to said lubrication well through said inlet holes.

5. A sealing ring for a shaft coupling having an annular chamber formed therein, said chamber being provided with perforations through one wall thereof, said chamber having an annular portion of a second wall thereof movable inwardly to permit entry into said chamber at any point around the outer circumference of said annular portion, said second wall being biased into closed position.

6. An end ring as described in the claim 5 in which the flexible wall is a metal spring disc.

7. An end ring seal for maintaining a well of lubricant in contact with a shaft coupling, said end ring having a cavity formed therein, said cavity being of uniform cross section and extending the circumferential length of said end ring, a plurality of holes radially disposed piercing a portion of the wall of said end ring seal and providing communication from the interior of said cavity to the zone adjacent said coupling, said wall also having an annular flexible portion therein, said flexible portion being movable inwardly of said cavity to provide entry into said cavity at any point around the circumference of said annular portion and said flexible portion being biased into the closed position.

References Cited in the file of this patent

UNITED STATES PATENTS

| | | |
|---|---|---|
| 1,770,743 | Morgan | July 15, 1930 |
| 2,148,274 | Lund | Feb. 21, 1939 |
| 2,842,945 | Swanson | July 15, 1958 |